United States Patent [19]
Feldman et al.

[11] 4,015,064
[45] Mar. 29, 1977

[54] MANUFACTURE OF POLYVINYL CHLORIDE OF LOW VINYL CHLORIDE MONOMER CONTENT

[75] Inventors: Martin L. Feldman, E. Brunswick; Robert S. Miller, Bridgewater, both of N.J.

[73] Assignee: Tenneco Chemicals, Inc., Saddle Brook, N.J.

[22] Filed: June 24, 1974

[21] Appl. No.: 482,115

[52] U.S. Cl. .............................. 528/491; 528/495; 528/501
[51] Int. Cl.² ......................................... C08F 6/10
[58] Field of Search ........ 260/92.8 A, 87.1, 29.6 R, 260/29.6 PT; 450/770, 774.5, 775; 528/491, 495, 501

[56] References Cited
UNITED STATES PATENTS

| | | | |
|---|---|---|---|
| 2,458,636 | 1/1949 | Plambeck | 260/92.8 A |
| 2,550,996 | 5/1951 | Halby | 260/92.8 A |
| 2,662,867 | 12/1953 | Hoertz et al. | 260/92.8 A |
| 2,673,193 | 3/1954 | Kolvoort | 260/92.8 A |
| 3,052,663 | 9/1962 | Bodlaender et al. | 260/92.8 A |
| 3,847,853 | 11/1974 | Suzuki et al. | 260/92.8 A |

*Primary Examiner*—Paul R. Michl
*Attorney, Agent, or Firm*—Evelyn Berlow

[57] ABSTRACT

Vinyl chloride is removed from a slurry or latex that contains from 100 to 15,000 parts per million of vinyl chloride and 5% to 50% by weight of a vinyl chloride polymer by adding to the slurry or latex from about 0.5% to 20% of its weight of a compound selected from the group consisting of vinyl acetate, methylene chloride, di-tert.butyl-p-cresol, and mixtures thereof, maintaining the resulting mixture at a temperature between 25° C. and 125° C. under vacuum, and removing the vinyl chloride vapor that is evolved until the slurry or latex contains not more than 50 ppm of vinyl chloride.

8 Claims, No Drawings

MANUFACTURE OF POLYVINYL CHLORIDE OF LOW VINYL CHLORIDE MONOMER CONTENT

SUMMARY OF THE INVENTION

The invention relates to a process whereby vinyl chloride monomer (VCM) is removed from the slurry or latex in aqueous processes for producing poly(vinyl chloride) (PVC). To the slurry or latex there is added vinyl acetate or other organic liquid, and from the resulting slurry or latex there is removed a vapor containing VCM. As a result, the PVC has less VCM associated therewith. Such slurry or latex is of low vinyl chloride monomer content, for example, ten parts per million (weight/weight), or even as low as not to be detected by gas chromatography with a sensitivity of analyzing 0.1 ppm VCM.

BACKGROUND OF THE INVENTION

From a commercial standpoint, vinyl chloride homopolymers and copolymers of vinyl chloride and other monomers, such as vinyl acetate, are among the most important polymers presently produced.

In the suspension or emulsion process, the polymerization reaction is conventionally carried out in an agitated reactor, from which the slurry or latex produced as a result of the polymerization reaction is stripped in the reactor at a temperature below about 65° C, or sometimes transferred to a hold tank, otherwise known as a stripper. A vacuum is applied to the stripper to remove unreacted monomer, and the slurry or latex is subsequently dewatered and dried to produce dried polymer.

The difficulty is, however that this procedure as conventionally practiced, results in the production of a slurry or latex of high vinyl chloride monomer content, for example, 100–15,000 parts per million (weight/weight).

There is recent evidence that vinyl chloride monomer may be a cause of rare liver cancer, known as angiosarcoma. Note Federal Register, Vol. 39, No. 92 - Friday, May 10, 1974 - pages 16898–16900.

The removal of VCM from the slurry or latex in the stripper or other equipment suitable for condensing, compressing or otherwise capturing the VCM reduces the concentration of VCM levels in the air in working areas is required for safe plant operation.

An additional benefit is that the VCM captured is added to the recovered monomer pool, thereby improving polymerization efficiency and economy. The added captured monomer accounts for about an additional one to four percent of the total VCM charged.

Poly(vinyl chloride) homopolymer and copolymers of vinyl chloride and other monomers are conventionally subjected to hot operations, such as milling, calendering and extruding, which release vinyl chloride monomer associated with the homopolymer or copolymer. There is therefore a need in the art for a procedure whereby there can be produced a homopolymer or copolymer of reduced vinyl chloride monomer content. This invention answers that need.

In the suspension process, vinyl chloride homopolymer and copolymers of vinyl chloride and other monomers are prepared by suspending the vinyl chloride monomer alone or in a mixture with other monomers in water by suspending agents and agitation. The polymerization is started by means of a suitable free radical generating polymerization initiator, such as lauroyl peroxide, benzoyl peroxide, diisopropylperoxydicarbonate, tertiary butylperoxypivalate, azobisisobutyronitrile, azobis-2,4-dimethylvaleronitrile, combinations of dialkylperoxydicarbonates and lauroyl peroxide, sulfonyl peroxides, and the like. Suspending agents such as methylcellulose, hydroxymethylcellulose, hydroxyethylcellulose, hydroxypropylmethylcellulose, hydrolyzed polyvinyl acetate, poly(vinyl alcohol), gelatin, methyl vinyl ether-maleic anhydride copolymers and combinations of the above are included in the reaction mixtures.

For the emulsion process, vinyl chloride homopolymer and copolymers of vinyl chloride and other monomers are prepared by conventional emulsion polymerization techniques. Free radical initiators, such as hydrogen peroxide, organic peroxides, persulfates, and redox systems are used. Surface active agents, such as alkyl sulfates, alkane sulfonates, alkylaryl sulfonates and fatty acid soaps are employed to emulsify the vinyl chloride monomer and comonomers, if any. An alternate method of dispersion resin preparation is described in U.S. Pat. No. 2,981,722 to Enk et al., granted Apr. 25, 1961.

When a copolymer of vinyl chloride and other monomers is prepared, the weight percent of the monomer, or mixtures of monomers, other than vinyl chloride can be up to thirty weight percent, based upon the total weight of the vinyl chloride and the other monomer or monomers copolymerized with the vinyl chloride. Among the monomers which can be copolymerized with the vinyl chloride are:

acrylic acid
acrylonitrile
n-butylacrylate
diallyl maleate
dibutyl maleate
diethyl fumarate
dimethyl itaconate
ethyl acrylate
ethylene
isobutylene
maleic anhydride
methacrylic acid
methacrylonitrile
methyl acrylate
methylvinyl ether
2-ethylhexyl acrylate
propylene
triallyl cyanurate
triallyl isocyanurate
trimethylolpropane trimethacrylate
vinyl acetate
N-vinylcarbazole
vinylidene chloride
vinylisobutyl ether
N-vinylpyrrolidone Further details concerning the production of vinyl chloride homopolymer and copolymers of vinyl chloride and other monomers by suspension and emulsion polymerization are set forth in Kirk-Othmer, Encyclopedia of Chemical Technology, Second Edition, Volume 21, pages 373–379.

In accordance with this invention, vinyl chloride is removed from the slurry or latex produced as a result of the conventional application of vacuum by further processing the slurry or latex, so that vinyl chloride vapor in a further amount is removed from the slurry or latex. The uniqueness of this invention is the addition of vinyl acetate or other organic liquid to the slurry or latex, before, during or following the normal residual monomer recovery, and removing vinyl chloride from the slurry or latex by stripping techniques practiced in the art, preferably at a temperature within the range from 25° C. to 125° C. The result is that the slurry or latex contains significantly reduced VCM content so that subsequent processing does not constitute a health hazard in the operating work areas. The result is that dried polymer produced after dewatering is of reduced vinyl chloride monomer content, and can therefore be further processed with reduced health hazard.

In practicing this invention, a single organic liquid, including one or more solutes, if desired, or a mixture or organic liquids, including one or more solutes, if desired, can be used. Organic liquids and solutes which can be used are esters such as vinyl acetate, vinyl propionate, n-butyl acrylate, dibutyl maleate; diethyl fumarate, dimethyl itaconate, ethyl acrylate, methylacrylate, octyl acrylate, ethyl acetate, di-2-ethylhexylphthalate and di-n-octylphthalate; hydrocarbons such as pentane, heptane, white oil, cyclohexane, methycyclopentane, benzene, toluene, xylene, ethylbenzene, styrene, pentene, hexene, heptene, butadiene, isoprene; alcohols such as methyl alcohol, ethyl alcohol, isopropyl alcohol, butanol, 2-ethylhexanol, dodecanol, cetyl alcohol, ethylene glycol, propylene glycol, and butylene glycol; phenols such as phenol, di-tertiary butyl para-cresol, styrenated phenols, butylated phenols and bisphenol A; ethers such as diethyl ether, methyl vinyl ether and low molecular weight polyethers; nitrogen-containing compounds such as triethylamine, triethanolamine, aniline, dimethylaniline, morpholine, pyridine, pyrrole, acetonitrile, acrylonitrile, methacrylonitrile, acetamide, dimethylacetamide, dimethylformamide, caprolactum, N-vinylcarbazole and N-vinylpyrrolidone; nitro compounds such as nitromethane, nitroethane and nitrobenzene; halogen-containing compounds such as methylchloride, methylene chloride, chloroform, carbon tetrachloride, ethylene dichloride, ethyl chloride, vinylidene chloride, chlorobenzene, and fluorinated methanes and ethanes; carboxylic acids such as formic acid, acetic acid, acrylic acid, methacrylic acid, lauric acid, stearic acid and oleic acid; aldehydes such as propionaldehyde, butyraldehyde and benzaldehyde; ketones such as acetone, methyl ethyl ketone, methyl isobutyl ketone, benzoin, benzophenone, methyl vinyl ketone and cyclohexanone; carboxylic acid anhydrides such as maleic anhydride and phthalic anhydride; acid chlorides such as acetyl chloride, benzoyl chloride and phthaloyl chloride; sulfur-containing compounds such as carbon disulfide, ethyl mercaptan, dodecyl mercaptan, dimethyl sulfoxide, dimethyl sulfone, tetramethylene sulfone, thioglycolic acid and thiophene; cyclic ethers such as dioxane, trioxane, furan, tetrahydrofuran, propylene oxide and butylene oxide; conventional diester and polymeric plasticizers for PVC such as phthalates, maleates and adipate diesters, phosphate esters and polyesters; dimethyl silicones; and liquid stabilizers for PVC such as dialkyl tin dilaurates including dibutyl tin dilaurate. In general the amount of organic solvent added to the slurry or latex will be from about 0.5 to about 20 percent by weight, based upon the weight of the slurry or latex, although smaller and larger amounts can also be used.

Those skilled in the art will understand that when the organic liquid used is of relatively low boiling point, such as vinyl acetate or methylene chloride, the liquid is essentially separated from the resin when the process of this invention is carried out. On the other hand, when the organic liquid used is relatively high boiling, such as di-2-ethylhexylphthalate, the organic liquid used essentially remains with the resin. This can be a further advantage of our invention, when the organic liquid is a conventional additive to vinyl chloride homopolymers and copolymers, as when the organic liquid is a commonly known stabilizer, lubricant, plasticizer, antioxidant, antifoam, antistatic agent, etc.

The following Examples illustrate the invention, and are not limitative thereof.

EXAMPLES 1-7

In each of Examples 1-7 (Table I), to a water slurry of a commercial homopolymer of vinyl chloride containing about 30 percent by weight of the homopolymer was added five percent by weight of vinyl acetate, based upon the initial weight of the water slurry, and from the mixture vinyl chloride was removed by vaporization. Table I sets forth the temperatures, pressures, vaporization times and results obtained.

In Table I, the VCM concentrations are concentrations of vinyl chloride monomer in ppm (weight/weight), based upon the weight of the resin.

Resins A and C were prepared using a mixture of lauroyl peroxide and di-2-ethylhexylperoxydicarbonate as the initiator and methylcellulose as the suspension agent. Resin B was prepared using the initiator used in preparing Resin A, hydroxypropylmethylcellulose as the suspension agent, and trichloroethylene as a chain transfer agent.

In Table I, each of the Examples relates to a laboratory treatment in which a 500 gram sample of slurry was treated in a one liter, agitated flask, with the exception of Example 5, where a 1500 gram sample was treated in a three liter, agitated flask.

EXAMPLES 8-15

In each of Examples 8-15 (Table II), a water slurry of a copolymer of vinyl chloride and vinyl acetate (vinyl acetate content about 8 to 16 percent by weight) to which a small amount of vinyl acetate had been added was heated and agitated at the temperature and pressure for the time stated with vinyl chloride monomer evolved being removed.

Resin D was prepared using the initiator of Resin A and the suspension agent of Resin B. Resin E was prepared using lauroyl peroxide as the initiator, gelatin as the suspension agent, and trichloroethylene as a chain transfer agent.

Examples 8-15 were laboratory experiments in which the amount of slurry treated was 500 grams.

In Table II, the VCM concentrations have the same meaning as in Table I. In examples 8-15, the added vinyl acetate was essentially removed from the resin.

EXAMPLE 16

About 550 grams of a latex containing about 30 percent by weight of a homopolymer of vinyl chloride was agitated in a one liter, three neck flask. The latex had been prepared using the initiator of Resin A and the ammonium salt of oxidized oleic acid as the suspension agent. The latex contained 5052 ppm VCM, based on the weight of the resin.

Twenty-five grams of vinyl acetate was added dropwise. A vacuum of 100 mm Hg was applied for two hours at room temperature. The latex then contained 888 ppm VCM, based on the weight of the resin.

After heating for 40 minutes at 55°–60° C. at 250 mm Hg vacuum, the latex contained 4.2 ppm VCM, based on the weight of the resin.

EXAMPLE 17

750 grams of a latex containing about 30 percent by weight of a copolymer prepared from vinyl chloride and vinyl acetate (vinyl acetate content about one to six percent by weight) was agitated in a one liter, three neck flask along with 35 grams of di-2-ethylhexylphthalate. The latex contained 264 ppm VCM, based upon the weight of the copolymer.

The mixture was stirred for 15 minutes under a vacuum of 630 mm Hg. Still under vacuum, the mixture was heated at 75° C. for one-half hour. The latex then contained 45 ppm VCM based upon the weight of the copolymer. Continuing the heating and stirring at the same temperature and with the same vacuum for a further period of one-half hour, the latex then contained 9 ppm VCM, based upon the weight of the copolymer. The bulk of the added di-2-ethylhexylphthalate essentially remained with the resin.

EXAMPLE 18

344 lbs. of a slurry (about 30% solids by weight) of vinyl chloride-vinyl acetate copolymer made with lauroyl peroxide as the initiator and gelatin as the suspending agent and containing trichloroethylene as the chain transfer agent was charged to a 50 gallon, glass-lined, agitated reactor. The slurry contained about 3000 ppm VCM, based upon the weight of the resin. The slurry was heated to 60° C. 10.32 lbs. of vinyl acetate was added and the reactor was sealed. The slurry was heated to 74° C. with agitation. A vacuum of 250 mm Hg was then applied to recover the VCM. The resultant slurry contained no detectable VCM by gas chromatography.

EXAMPLE 19

The resin utilized was a dried commercial homopolymer of vinyl chloride prepared by the suspension process using a combination of lauroyl peroxide and di-2-ethylhexylperoxydicarbonates as the initiator and hydroxypropylmethylcellulose as the suspending agent. The homopolymer had a VCM content of 145 parts per million (ppm).

The homopolymer was slurried in 400 ml. of water in a one liter, agitated flask to provide a slurry containing 35% by weight of solids. To the slurry 50 ml. of methylene chloride was added. The mixture was steam stripped to remove all the methylene chloride, following which the resin was separated by filtration and dried at 40° C. overnight. The dried resin had a vinyl chloride monomer content not detected by gas chromatography.

EXAMPLE 20

An aqueous slurry was used containing 65% by weight of a commercial vinyl chloride homopolymer prepared by the suspension process using the initiator system and the suspending agent of example 19. The slurry contained about 9,000 ppm of vinyl chloride monomer, based upon the weight of the homopolymer.

To 450 grams of the slurry in a one liter, agitated flask there was added 50 ml. of methylene chloride. The mixture was stirred for one-half hour at room temperature, after which a vacuum was applied for a period of two hours by means of a water aspirator. The slurry was then filtered and dried overnight at 50° C. Vinyl chloride monomer could not be detected by means of gas chromatography.

EXAMPLE 21

The procedure of Example 2 was repeated, but in this Example 21 the 25 grams of vinyl acetate added had previously admixed with it 5 grams of di-tert-butyl-para-cresol. Results similar to those obtained in Example 2 were obtained with respect to the VCM concentration (ppm) of Table I. Those skilled in the art will understand that upon further processing the slurry to produce solid resin, the di-tert-butyl-para-cresol will remain in the resin and serve as an anti-oxidant.

TABLE I

| Example | Resin | Initial VCM Concentration (ppm) | Vinyl Acetate (%) | Temp. (° C.) | Vacuum* (mm Hg) | VCM Concentration (ppm) ½Hr. | 1 Hr. | 2 Hr. |
| --- | --- | --- | --- | --- | --- | --- | --- | --- |
| 1 | A | 912 | 5 | 25 | 62 | | 173 | 187 |
| 2 | A | 912 | 5 | 45 | 200 | | N.D. | |
| 3 | B | 795 | 5 | 25 | 100 | | 125 | 138 |
| 4 | B | 795 | 5 | 45 | 200 | | N.D. | |
| 5 | B | 3351 | 5 | 90 | 620 | N.D. | | |
| 6 | C | 330 | 5 | 25 | 100 | | 32 | 31 |
| 7 | C | 330 | 5 | 45 | 200 | | N.D. | |

N.D. = Non Detectable
*Differential in height of a Hg manometer

TABLE II

| Example | Resin | Initial VCM Concentration (ppm) | Vinyl Acetate (%) | Temp. (° C.) | Vacuum* (mm Hg) | ¼Hr. | ½Hr. | ¾Hr. | 1 Hr. | 2 Hr. |
| --- | --- | --- | --- | --- | --- | --- | --- | --- | --- | --- |
| 8 | D | 249 | 5 | 25 | 28 | | | | N.D. | |
| 9 | D | 249 | 5 | 45 | 100 | | | | N.D. | |
| 10 | D | 249 | 5 | 45 | 200 | | | | N.D. | |
| 11 | D | 249 | 2 | 75 | 510 | 1 | N.D. | | | |
| 12 | D | 249 | 2 | 85 | 620 | N.D. | | | | |
| 13 | E | 2556 | 2 | 60 | 200 | 29 | 33 | — | 36 | |
| 14 | E | 2556 | 3 | 45 | 200 | 2 | 3 | 5 | 5 | |
| 15 | E | 2556 | 3 | 90 | 620 | | N.D. | | | |

N.D. = Non Detectable
*Differential in height of a Hg manometer

We claim:

1. The process for the removal of vinyl chloride from a slurry or latex that contains from about 100 parts to 15,000 parts by weight of vinyl chloride per million parts by weight of said slurry or latex and from 5% to 50% by weight of a polymer selected from the group consisting of polyvinyl chloride and copolymers of vinyl chloride with at least one monomer copolymerizable therewith that comprises the steps of
    a. adding to the slurry of latex from about 0.5% to 20% by weight, based on the weight of the surry or latex, of a compound selected from the group consisting of vinyl acetate, methylene chloride, di-tert-.butyl-p-cresol, and mixtures thereof,
    b. maintaining the slurry or latex at a temperature in the range of 25° C. to 125° C. at a vacuum in the range of about 28 mm. to 630 mm. Hg, and
    c. removing the vinyl chloride vapor that is evolved until the slurry or latex contains less than 50 ppm. of vinyl chloride.

2. The process of claim 1 wherein the compound that is added in Step a) is vinyl acetate.

3. The process of claim 1 wherein the compound that is added in Step a) is methylene chloride.

4. The process of claim 1 wherein the compound that is added in Step a) is di-tert.butyl-p-cresol.

5. The process of claim 1 wherein in Step b) the slurry or latex is maintained at a temperature in the range of 25° C. to 90° C.

6. The process of claim 1 wherein the polymer in the slurry or latex is polyvinyl chloride.

7. The process of claim 1 wherein the polymer in the slurry or latex is a copolymer of vinyl chloride and up to 30 percent by weight of vinyl acetate.

8. The process of claim 1 wherein in Step c) the removal of the vinyl chloride vapor that is evolved is continued until the slurry or latex contains less than 10 ppm of vinyl chloride.

* * * * *